June 26, 1962 — S. HOWELL — 3,040,427

METHOD OF UNITING COPPER AND ALUMINUM TUBES

Filed Aug. 29, 1958

STANLEY HOWELL
INVENTOR.

BY *Albert M. Parker*
ATTORNEY.

United States Patent Office 3,040,427
Patented June 26, 1962

3,040,427
METHOD OF UNITING COPPER AND ALUMINUM TUBES
Stanley Howell, 10 Waldron Road, Sefton, near Sydney, New South Wales, Australia
Filed Aug. 29, 1958, Ser. No. 758,153
4 Claims. (Cl. 29—474.3)

This invention relates to the joining together of two different types of non-ferrous tubing such as copper and aluminum, and has special reference to the pipe line systems of refrigerators where copper tubing is required for a certain section of the line which is continued in aluminum tubing.

The known methods of fusing or uniting copper tubing and aluminum tubing are rather costly, and the present invention has been devised to provide a novel and simple method whereby such forms of tubing can be joined together in a strong, leaktight and durable manner.

Joined tubing according to the invention may be formed in lengths for use in pipe line systems as the aluminum end may easily be joined to an aluminum pipe, while the copper end may also be joined very easily to a copper pipe if necessary.

According to this invention the method of joining or uniting non-ferrous tubing as copper and aluminum together consists in first preparing the end of the copper tube to be joined by swaging or flaring same to form a socket in which the end of the aluminum tube is inserted, and then applying a combined torsional and end load to either or both tubes, tending to rotate same on each other under the end pressure, heat then applied to the engaged ends or joint portion, and the surface of the aluminum tubing in contact with the copper tubing melting and fusing to the copper at a suitable temperature below its normal melting temperature, and at least one of the said tubes rotating with respect to the other under the applied end pressure and torsional loads, until the required length of the aluminum tube has entered the copper tube, the heat then being removed, and the joint allowed to cool.

The torsional load is slightly less than is required to overcome the friction resulting from the end pressure.

It is preferable to maintain end pressure and torsional loads during the cooling operation until the molten metal solidifies.

After cooling, the joint may be cleaned off smoothly in any suitable manner, and the displaced metal internally of the joint also removed in any known manner.

In order to describe the invention more fully reference will now be made to the accompanying drawings, wherein;

FIGURE 3 shows the tubing in FIGURE 1 brought together and united by heating in the third stage, while

Figure 1:
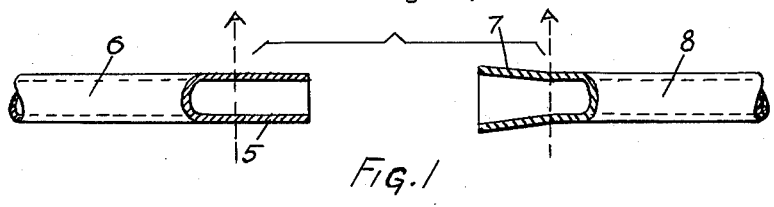
FIGURE 1 illustrates end portions of aluminum and copper tubing prepared for uniting according to the invention.

In the first stage all the oxidized film is removed from the external surface of the end 5 of the aluminum tube 6, and from inside the previously flared end 7 of the copper tube 8, and in FIGURE 1 broken lines A indicate the minimum distance back the oxidized film is to be removed from the ends of the tubes.

Figure 2:
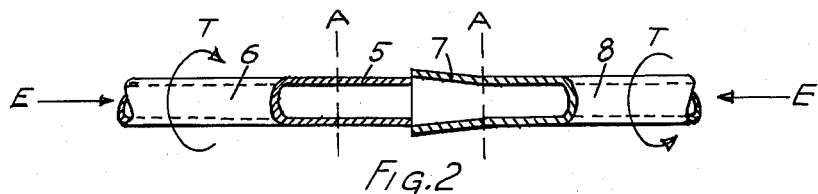
FIGURE 2 shows such tubing brought together in the second stage and applied end pressure and torsional loads shown by directional arrows.

The ends 5 and 7 of the tubing thus prepared are brought together as shown in FIGURE 2, and by means of a suitable machine or other appliance end pressure denoted by arrows E and torsional loads T are simultaneously applied, which latter tends to rotate them in opposite directions. If desirable one tube may be held without rotating.

Figure 3:
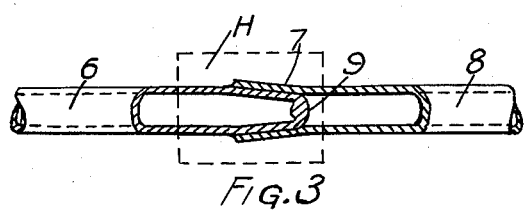

Heat is now applied in a heating zone H in the third stage shown in FIGURE 3, and electrical, gas or other means may be used for heating the ends 5 and 7 of said tubing.

When the correct heat temperature has been reached at the junction end of the said tubes 6 and 8, the combined end pressure E and torsional loads T cause the aluminum tube 6 to enter the flared end 7 of the copper tube 8.

Owing to the natural properties of the said aluminum and copper tubing, the outer surface of the end 5 of the aluminum tubing 6 in contact with the copper tubing 8, appears to melt and fuse to the copper at a temperature slightly below its normal temperature.

Owing to the surface of the aluminum now being in a molten or semi-liquid state, friction is overcome and the two tubes 6 and 8 will rotate with respect to each other under end pressure E and torsional loads T.

The applied heat is kept constant until the required length of aluminum tube 6 has entered the flared end 7 of the copper tube 8.

Figure 4:
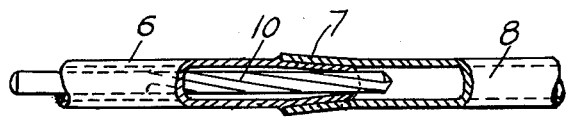
FIGURE 4 illustrates the use of a twist drill or the like to open a passage through the tube closed by the uniting method.

After cooling the joint of the tubes 6 and 8, the displaced metal 9 may be removed internally by a twist drill 10 (or by other suitable means) as shown in FIGURE 4.

Figure 5:
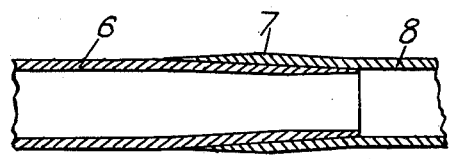
FIGURE 5 is an enlarged section showing some of the surplus metal removed from the finished joint.

Surplus metal may be removed from inside and outside the joint 7 in any approved manner (see FIGURE 5), and if necessary the bore of the aluminum tube 6 at the joint 7 may be made to approximate the bore of the copper tube 8 without any weakening of said joint.

I claim:

1. A method of joining or uniting copper and aluminum tubes to form a tight joint which comprises, first preparing the end of the copper tube to be joined by flaring such end to form a socket for reception of the end of the aluminum tube, removing any oxidized film from the surfaces of such copper and aluminum tube to be brought together, bringing said tubes together into surface to surface contact, applying a combined torsional and end load to at least one of said tubes tending to rotate one against the other while under said end pressure, applying heat to the engaged portions of said tubes to melt at least the outer surface of said aluminum tube to fuse said aluminum to said copper at a temperature below the melting temperature of said copper, and, while said surface of said aluminum tube is molten, rotating one of said tubes with respect to the other while under said end load until the required length of said aluminum tube has entered said copper tube, then removing the heat and allowing the joint to cool.

2. A method of joining or uniting tubing such as copper and aluminum tubing together according to claim 1, wherein the torsional load applied is slightly less than is required to overcome the friction resulting from the end pressure.

3. A method of joining or uniting tubing such as copper and aluminum tubing together according to claim 1, wherein the end pressure and torsional load are maintained during initial cooling.

4. The method as set forth in claim 1 in which the loads applied to the tubes are insufficient to distort the copper tube substantially.

References Cited in the file of this patent

UNITED STATES PATENTS

| | | |
|---|---|---|
| 2,040,240 | Coberty | May 12, 1936 |
| 2,094,495 | Robinson et al. | Sept. 28, 1937 |
| 2,258,913 | Stone | Oct. 14, 1941 |
| 2,268,343 | Phillips | Dec. 30, 1941 |
| 2,482,178 | Harris et al. | Sept. 20, 1949 |
| 2,782,498 | Mushovic et al. | Feb. 26, 1957 |
| 2,795,039 | Hutchins | June 11, 1957 |
| 2,823,933 | Hickman et al. | Feb. 18, 1958 |

FOREIGN PATENTS

| | | |
|---|---|---|
| 427,912 | Great Britain | May 2, 1935 |
| 572,789 | Great Britain | Oct. 24, 1945 |
| 667,143 | Great Britain | Feb. 27, 1952 |